(12) United States Patent
Caporal Del Barrio et al.

(10) Patent No.: US 12,225,497 B2
(45) Date of Patent: Feb. 11, 2025

(54) POSITIONING OF TERMINAL DEVICES

(71) Applicant: NOKIA TECHNOLOGIES OY, Espoo (FI)

(72) Inventors: Samantha Caporal Del Barrio, Aalborg (DK); Simon Svendsen, Aalborg (DK); Johannes Harrebek, Aalborg (DK); Benny Vejlgaard, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 298 days.

(21) Appl. No.: 17/862,122

(22) Filed: Jul. 11, 2022

(65) Prior Publication Data
US 2023/0017529 A1    Jan. 19, 2023

(30) Foreign Application Priority Data
Jul. 12, 2021  (FI) ...................................... 20215801

(51) Int. Cl.
*H04W 64/00* (2009.01)
*H01Q 21/29* (2006.01)

(52) U.S. Cl.
CPC ............ *H04W 64/00* (2013.01); *H01Q 21/29* (2013.01)

(58) Field of Classification Search
CPC ............................... H04W 64/00; H01Q 21/29
See application file for complete search history.

(56) References Cited

U.S. PATENT DOCUMENTS

| | | |
|---|---|---|
| 10,708,919 B2 | 7/2020 | Subramanian et al. |
| 10,757,661 B1 | 8/2020 | Zhu |

(Continued)

FOREIGN PATENT DOCUMENTS

| | | |
|---|---|---|
| EP | 4002709 A1 | 5/2022 |
| WO | WO 2018/124954 A1 | 7/2018 |

(Continued)

OTHER PUBLICATIONS

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 v16.0.0, (Mar. 2020), 107 pages.

(Continued)

*Primary Examiner* — Wayne H Cai
(74) *Attorney, Agent, or Firm* — ALSTON & BIRD LLP

(57) ABSTRACT

To facilitate positioning a user device, the user device is configured to measure, per an antenna array, reference signals received from transmission-reception points and to check, whether a downlink reference signal from a transmission-reception point is received in a serving antenna array and in one or more non-serving antenna arrays with a first delay. A non-serving antenna array receiving the signal with the first delay is an alternative antenna array to the serving antenna array. When the serving antenna array is under a maximum permissible exposure event, the user device is configured to select, which one of one or more alternative antenna arrays and the serving antenna panel is to be used for transmitting at least a positioning signal to the transmission-reception point.

20 Claims, 4 Drawing Sheets

(56) References Cited

U.S. PATENT DOCUMENTS

| | | | |
|---|---|---|---|
| 2014/0329553 A1* | 11/2014 | Nakashima | H04W 52/365 455/522 |
| 2019/0044561 A1 | 2/2019 | Fernando et al. | |
| 2019/0379427 A1 | 12/2019 | Geekie et al. | |
| 2020/0169336 A1 | 5/2020 | Modarres Razavi et al. | |
| 2020/0229126 A1 | 7/2020 | Soriaga et al. | |
| 2020/0382187 A1 | 12/2020 | Brunel | |
| 2020/0411960 A1 | 12/2020 | Ng et al. | |
| 2021/0266050 A1* | 8/2021 | Sahoo | H04B 7/0632 |

FOREIGN PATENT DOCUMENTS

| | | |
|---|---|---|
| WO | WO 2019/221567 A1 | 11/2019 |
| WO | WO 2020/262859 A1 | 12/2020 |
| WO | WO 2021/092072 A1 | 5/2021 |

OTHER PUBLICATIONS

CATT et al., "New WID on NR Positioning Enhancements" 3GPP TSG RAN Meeting #90e, RP-202900, (Dec. 7-11, 2020), 5 pages.

Communication of Acceptance for Finland Application No. 20215801 dated Feb. 11, 2022, 7 pages.

Ericsson, "Additional Scenarios for Performance Evaluations", 3GPP TSG-RAN WG1 Meeting #101-e, R1-2004650, (May 25-Jun. 5, 2020), 13 pages.

Ericsson, "Introduction of NR Positioning Support", 3GPP TSG-RAN WG1 Meeting #99, R1-1913661, CR 0029, (Nov. 18-22, 2019), 11 pages.

Extended European Search Report for European Application No. 22180661.5 dated Nov. 14, 2022, 8 pages.

Intel Corporation et al., "New WID: NR Positioning Support", RP-190752, (Mar. 18-21, 2019), 6 pages.

Interdigital et al., "Introduction of MPE Reporting", 3GPP RAN WG2 Meeting #111-e, R2-2008595, CR 1873, (Aug. 17-28, 2020), 6 pages.

InterDigital Inc., "Introduction of MPE Related P-MPR Operation in Sub-Clause 6.2.4", 3GPP TSG-RAN WG4 Meeting #96-3, R4-2011735, CR 0216, (Aug. 17-28, 2020), 3 pages.

InterDigital Inc., "Introduction of the P-MPR 2 Bits Report Mapping in 38.133", 3GPP TSG-RAN WG4 Meeting #96-3, R4-2011736, CR 0914, (Aug. 17-28, 2020), 2 pages.

Interdigital, "Introduction of MPE Reporting", 3GPP RAN WG2 Meeting #111- e, R2-2008570, CR 0883, (Aug. 17-28, 2020), 9 pages.

Qualcomm Incorporated, "New SID on NR Positioning Enhancements", 3GPP TSG RAN Meeting #86, RP-193237, (Dec. 9-12, 2019), 4 pages.

Xiang et al., "A Computer Vision Aided Beamforming Scheme with EM Exposure Control in Outdoor LOS Scenarios", 2020 IEEE 3rd International Conference on Information Communication and Signal Processing (ICICSP), (Sep. 12-15, 2020), 6 pages.

* cited by examiner

POSITIONING OF TERMINAL DEVICES

CROSS-REFERENCE TO RELATED APPLICATIONS

This application claims priority to Finnish Application No. 20215801, filed Jul. 12, 2021, the entire contents of which are incorporated herein by reference.

TECHNICAL FIELD

Various example embodiments relate to wireless communications.

BACKGROUND

Wireless communication systems are under constant development. New applications, use cases and industry verticals are to be envisaged with accurate positioning performance requirements. To position a user terminal uplink and downlink position signals are transmitted and measured and measurement results are reported to a network element for positioning the user terminal.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided an apparatus comprising at least two antenna arrays; at least one processor; and at least one memory including computer program code, the at least one memory and computer program code being configured to, with the at least one processor, cause the apparatus at least to perform: measuring, per an antenna array, downlink reference signals received from transmission-reception points; checking, per a transmission-reception point, based on measurement results, whether a downlink reference signal from the transmission-reception point is received in a serving antenna array and in one or more non-serving antenna arrays with a first delay; determining, per a non-serving antenna array included in the one or more non-serving antenna arrays that received the downlink reference signal with the first delay, the non-serving antenna array to be an alternative antenna array to the serving antenna array; selecting, when the serving antenna array is under a maximum permissible exposure event, based on at least power levels of corresponding antenna arrays, which one of one or more alternative antenna arrays and the serving antenna panel is to be used for transmitting at least a positioning signal to the transmission-reception point; and transmitting at least the positioning signal to the transmission-reception point using the selected antenna array.

In an embodiment, the at least one memory and computer program code are configured to, with the at least one processor, cause the apparatus further to at least to perform: storing information on alternative antenna arrays to a specific list; and using the information in the specific list when performing the selecting.

In an embodiment, the at least one memory and computer program code are configured to, with the at least one processor, cause the apparatus further to at least to perform: storing information on alternative antenna arrays to a specific list; and determining differences in power levels between the serving antenna array and the one or more alternative antenna arrays using the information in the specific list.

In an embodiment, the at least one memory and computer program code configured to, with the at least one processor, cause the apparatus further to at least to perform: selecting an antenna array for positioning signal transmission and positioning report transmission and an antenna array for positioning signal reception using the determined differences, wherein if the difference is not within an uplink threshold, selecting the serving antenna array for the positioning signal transmission and the positioning report transmission and for the positioning signal reception; if the difference is within the uplink threshold but not within a downlink threshold, selecting an alternative antenna array for the positioning signal transmission and the positioning report transmission and the serving antenna array for positioning signal reception; and if the difference is within the uplink threshold and within the downlink threshold, selecting an alternative antenna array for the positioning signal transmission and the positioning report transmission and for positioning signal reception, wherein selecting the alternative antenna array includes configuring a beam in the alternative array.

In embodiments, the at least one memory and computer program code are configured to, with the at least one processor, cause the apparatus further to perform the selecting after receiving a positioning request.

In embodiments, the at least one memory and computer program code are configured to, with the at least one processor, cause the apparatus further to perform the checking, determining and selecting in response to a trigger event being detected.

In embodiments, the at least one memory and computer program code are configured to, with the at least one processor, cause the apparatus further to perform the checking in a continuous manner and the determining and selecting in response to a trigger event being detected.

In embodiments, the trigger event is a maximum permissible exposure event.

An aspect provides a method for an apparatus comprising at least two antenna arrays, the method comprising: measuring, per an antenna array, downlink reference signals received from transmission-reception points; checking, per a transmission-reception point, based on measurement results, whether a downlink reference signal from the transmission-reception point is received in a serving antenna array and in one or more non-serving antenna arrays with a first delay; determining, per a non-serving antenna array included in the one or more non-serving antenna arrays that received the downlink reference signal with the first delay, the non-serving antenna array to be an alternative antenna array to the serving antenna array; selecting, when the serving antenna array is under a maximum permissible exposure event, based on at least power levels of corresponding antenna arrays, which one of one or more alternative antenna arrays and the serving antenna panel is to be used for transmitting at least a positioning signal to the transmission-reception point; and transmitting at least the positioning signal to the transmission-reception point using the selected antenna array.

An aspect provides a computer readable medium comprising program instructions for causing an apparatus to perform at least the following: measuring, per an antenna array, downlink reference signals received from transmission-reception points; checking, per a transmission-reception point, based on measurement results, whether a downlink reference signal from the transmission-reception point is received in a serving antenna array and in one or more non-serving antenna arrays with a first delay; determining, per a non-serving antenna array included in the one or more non-serving antenna arrays that received the downlink reference signal with the first delay, the non-serving antenna array to be an alternative antenna array to the serving antenna array; selecting, when the serving antenna array is under a maximum permissible exposure event, based on at least power levels of corresponding antenna arrays, which one of one or more alternative antenna arrays and the serving antenna panel is to be used for transmitting at least a positioning signal to the transmission-reception point; and transmitting at least the positioning signal to the transmission-reception point using the selected antenna array.

In an embodiment, the computer readable medium is a non-transitory computer readable medium.

An aspect provides a non-transitory computer readable medium comprising program instructions for causing an apparatus to perform at least the following: measuring, per an antenna array, downlink reference signals received from transmission-reception points; checking, per a transmission-reception point, based on measurement results, whether a downlink reference signal from the transmission-reception point is received in a serving antenna array and in one or more non-serving antenna arrays with a first delay; determining, per a non-serving antenna array included in the one or more non-serving antenna arrays that received the downlink reference signal with the first delay, the non-serving antenna array to be an alternative antenna array to the serving antenna array; selecting, when the serving antenna array is under a maximum permissible exposure event, based on at least power levels of corresponding antenna arrays, which one of one or more alternative antenna arrays and the serving antenna panel is to be used for transmitting at least a positioning signal to the transmission-reception point; and transmitting at least the positioning signal to the transmission-reception point using the selected antenna array.

An aspect provides a computer program comprising instructions for causing an apparatus to perform at least the following: measuring, per an antenna array, downlink reference signals received from transmission-reception points; checking, per a transmission-reception point, based on measurement results, whether a downlink reference signal from the transmission-reception point is received in a serving antenna array and in one or more non-serving antenna arrays with a first delay; determining, per a non-serving antenna array included in the one or more non-serving antenna arrays that received the downlink reference signal with the first delay, the non-serving antenna array to be an alternative antenna array to the serving antenna array; selecting, when the serving antenna array is under a maximum permissible exposure event, based on at least power levels of corresponding antenna arrays, which one of one or more alternative antenna arrays and the serving antenna panel is to be used for transmitting at least a positioning signal to the transmission-reception point; and transmitting at least the positioning signal to the transmission-reception point using the selected antenna array.

An aspect provides an apparatus comprising at least two antenna arrays and means for performing: measuring, per an antenna array, downlink reference signals received from transmission-reception points; checking, per a transmission-reception point, based on measurement results, whether a downlink reference signal from the transmission-reception point is received in a serving antenna array and in one or more non-serving antenna arrays with a first delay; determining, per a non-serving antenna array included in the one or more non-serving antenna arrays that received the downlink reference signal with the first delay, the non-serving antenna array to be an alternative antenna array to the serving antenna array; selecting, when the serving antenna array is under a maximum permissible exposure event, based on at least power levels of corresponding antenna arrays, which one of one or more alternative antenna arrays and the serving antenna panel is to be used for transmitting at least a positioning signal to the transmission-reception point; and transmitting at least the positioning signal to the transmission-reception point using the selected antenna array.

An aspect provides a system comprising: a plurality of transmission-reception points configured to transmit different reference signals to and measure positioning signals from apparatuses; and at least one apparatus comprising at least two antenna arrays and configured to; measure, per an antenna array, downlink reference signals received from transmission-reception points of the plurality of transmission-reception points; check, per a transmission-reception point, based on measurement results, whether a downlink reference signal from the transmission-reception point is received in a serving antenna array and in one or more non-serving antenna arrays with a first delay; determine, per a non-serving antenna array included in the one or more non-serving antenna arrays that received the downlink reference signal with the first delay, the non-serving antenna array to be an alternative antenna array to the serving antenna array; select, when the serving antenna array is under a maximum permissible exposure event, based on at least power levels of corresponding antenna arrays, which one of one or more alternative antenna arrays and the serving antenna panel is to be used for transmitting at least a positioning signal to the transmission-reception point; and transmit at least the positioning signal to the transmission-reception point using the selected antenna array.

An aspect provides a system comprising: first means for transmitting different reference signals to and measuring positioning signals from second means; second means for receiving and transmitting via at least one of plurality of antenna arrays, for measuring, per an antenna array, downlink reference signals received from first means; for checking, per a first means, based on measurement results, whether a downlink reference signal from the first means is received in a serving antenna array and in one or more non-serving antenna arrays with a first delay; for determining, per a non-serving antenna array included in the one or more non-serving antenna arrays that received the downlink reference signal with the first delay, the non-serving antenna array to be an alternative antenna array to the serving antenna array; for selecting, when the serving antenna array is under a maximum permissible exposure event, based on at least power levels of corresponding antenna arrays, which one of one or more alternative antenna arrays and the serving antenna panel is to be used for transmitting at least a positioning signal to the first means; and for transmitting at least the positioning signal to first means using the selected antenna array.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
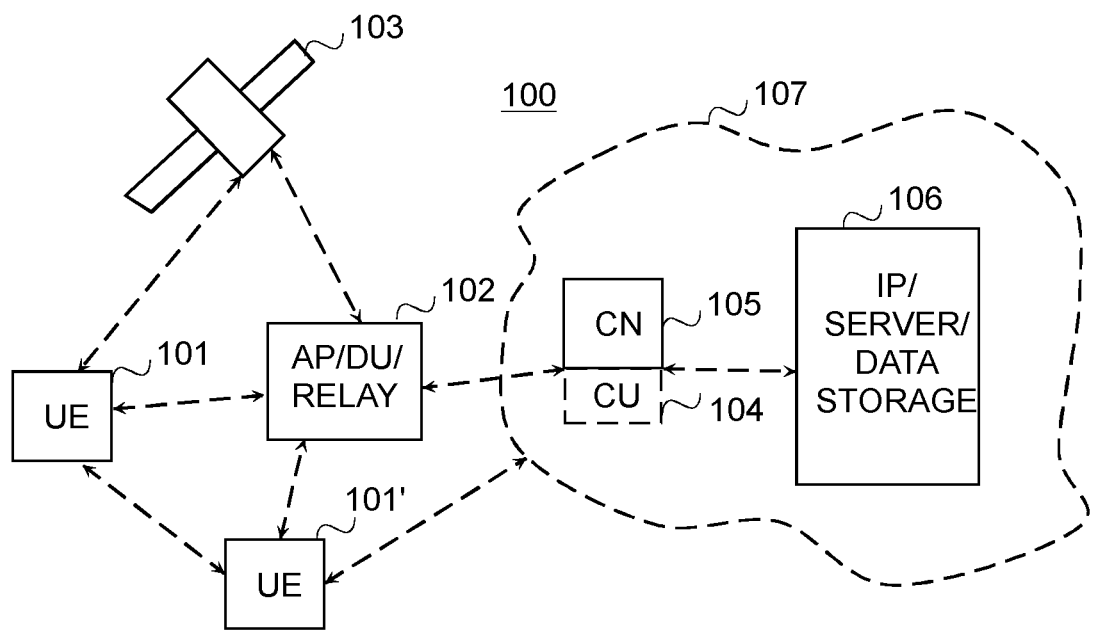
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus.

The user device typically refers to a portable computing device that includes wireless mobile communication devices operating with a subscription entity, for example a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, wearable device, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors micro-controllers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more integrated access and backhaul (IAB) nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In 5G and beyond, it is envisaged that use of smart devices, that may move, will increase thereby posing different latency and accuracy requirements for positioning the smart devices in connected robotics and autonomous systems, for example. A non-limiting list of examples of such mobile smart devices include unmanned mobility with fully autonomous connected vehicles, other vehicle-to-everything (V2X) services, or smart industry with different Industrial Internet of Things (IIoT) devices, such as automated guided vehicles or mobile robots or mobile robot arms. Naturally, for positioning of user devices, like smart phones or smart wearable devices, including different smart accessories, different latency and accuracy requirements for positioning them may also be posed. Below term user device is used to cover all kind of smart devices that can be positioned, including the above listed examples without limiting smart devices to the listed examples.

Figure 2:
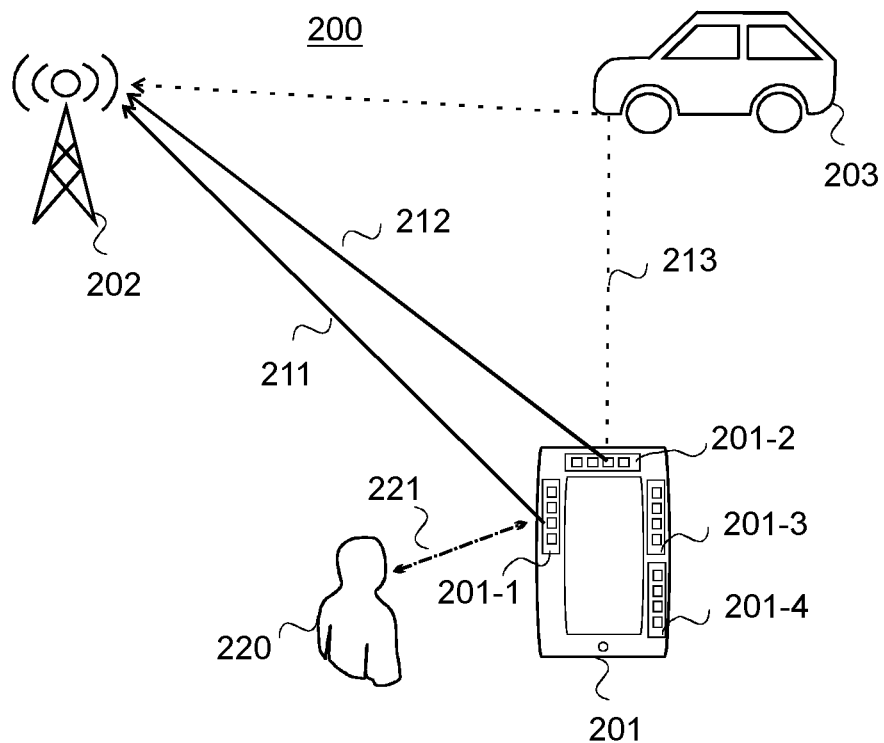
FIG. 2 illustrates an exemplified positioning architecture.

In 5G and beyond, a user device position is estimated by a core network element called a location management function, LMF, using information received from a radio access network. FIG. 2 provides a highly simplified example of a radio access network architecture 200 disclosing operational entities involved in providing information for positioning estimation of a user device, the operational entities being the user device 201 and a transmission-reception point 202, the one illustrated depicting a plurality of transmission-reception points.

In 5G and beyond, one of the positioning techniques providing high accuracy is a multi-cell round trip time positioning, in which a user device position is estimated based on measurements performed by the user device 201 on signals received from one or more transmission-reception points 202, and by measurements performed by transmission-reception points 202 on signals received from the user device 201.

In 5G and beyond, a variety of different frequency bands will be utilized for transmitting data over the air, including frequencies in the millimeter wave region of the spectrum. When utilized frequencies are 300 kHz to 100 GHz, as the millimeter wave region of the spectrum is, there are governmental limits, called maximum permissible exposure (MPE) limits, for field strength and power density for the transmitters operating at said frequencies, to prevent health issues of humans 220, called below users. Depending on both a distance 221 separating the human tissue from an antenna array of the user device 201, and the antenna array, for example how many antenna elements the antenna array contains and what is the maximum transmission power, for uplink transmissions a power back-off may be required. The closer the user 220 is, the bigger is the power back-off. Furthermore, the user, when close to the antenna, acts, when frequencies in the millimeter wave region are used, as a reflective surface, which may cause a change whereto a transmission beam points.

The user device 201 is a device that may move and/or contain movable parts and comprises two or more antenna arrays (panels) 201-1, 201-2, 201-3, 201-4 to communicate with a radio access network. The user device may be called a multi-panel user device. Depending on an implementation, the user device 201 may be configured to use one antenna array at a time as a serving (active) antenna array for transmission/reception, or to use two or more antenna arrays at a time as serving antenna arrays for transmission/reception, or to use two or more antenna arrays at a time as serving antenna arrays for reception but only one of them for transmission. In the below examples it is assumed, for the sake of clarity of the description, that one antenna array is used for transmission. Hence, depending on antenna array configurations and which antenna array is used, an uplink transmission may reach the transmission-reception point 202 over a line-of-sight path 211 from the antenna array 201-1, or over a line-of-sight path 212 from the antenna array 201-2 and/or via a reflected path 213, an obstacle 203 causing the reflection. For the multi-cell round trip time positioning, the user device is configured to transmit positioning signaling using a serving antenna array or an alternative antenna array to the transmission-reception point, selected based on measurement results of different reference signals from transmission reception points, as will be described in more detail below.

An apparatus 202 configured to act as a transmission-reception point, called herein the transmission-reception point, may be a base station or an access node, or an operational entity comprising one or more antennas in a base station, or an operational entity comprising one or more remote radio heads, or a remote antenna of a base station, or any other set of geographically co-located antennas forming one operational entity, for example an antenna array with one or more antenna elements, for one cell in the radio access network, or for a part of the one cell. In other words, one cell may include one or multiple transmission points, and cells in the radio access network comprise transmission-reception points. For the multi-cell round trip time positioning, the transmission-reception points are configured to transmit different reference signals to user devices, and in turn measure positioning signaling from user devices.

FIGS. 3 to 6 illustrate different example functionalities of the user device to be positioned. In the illustrated examples it is assumed, for the sake of clarity of the description that one antenna array, called a serving antenna array, at a time may be used for uplink transmissions. It is a straightforward measure for one skilled in the art how to implement the disclosed examples to solutions in which two or more serving antenna arrays can be used at a time for uplink transmissions. Further, in the examples the measuring of reference signals from all detectable transmission-reception points is illustrated to be performed in one block, for the clarity of the description, even though the functionality may be performed as overlapping with other blocks, and the user device may be capable to perform measurements simultaneously or sequentially on all antenna arrays. Further, the details how a maximum permissible exposure event is detected, or predicted, are not described, since the details are known by a person skilled in the art and the details are irrelevant to the examples.

Figure 3:
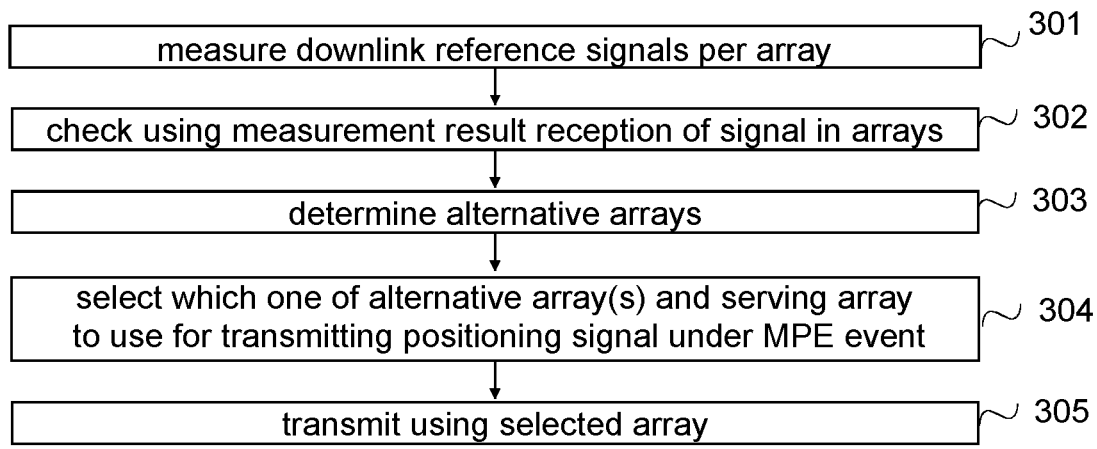
FIGS. 3 to 6 are flow charts illustrating an example functionality of an apparatus to be positioned.

Referring to FIG. 3, the user device measures in block 301, per an antenna array, downlink reference signals received from transmission-reception points. For example, the user device may scan antenna arrays to monitor and measure synchronization signal bursts. A synchronization signal burst comprises multiple synchronization signal blocks. In 5G, a synchronization signal block is transmitted using directional beams, and it may carry a primary synchronization signal, a secondary synchronization signal and a physical broadcast channel with a demodulation reference signal, which is used to estimate reference signal received power. Naturally any corresponding signal may be used as a reference signal.

The user device also checks, in block 302, per a transmission-reception point, based on measurement results, whether a downlink reference signal from the transmission-reception point is received in a serving antenna array and in one or more non-serving antenna arrays with a first delay. In other words, referring to FIG. 2, the user device checks, assuming that the antenna array 201-1 is the serving antenna array and receives from the transmission-reception point 202 a reference signal with a first delay, whether the antenna arrays 201-2, 201-3, 201-4 have received from the transmission-reception 202 the reference signal with the first delay, or with another delay. The same checking is performed to transmission-reception points wherefrom the serving antenna array has received reference signals. The checking may also be performed per a non-serving antenna array. Furthermore, it should be noted that different transmission-reception points may have different serving antenna arrays. A time of arrival may be used as the delay, or as a basis to determine the delay.

The user device determines, in block 303, per a non-serving antenna array included in the one or more non-serving antenna arrays that received the downlink reference signal with the first delay, the non-serving antenna array to be an alternative antenna array to the serving antenna array. In other words, if a non-serving antenna array received the reference signal, which the serving antenna array also received, with the same delay as the service antenna, it will be an alternative antenna for the serving antenna. Using the example in FIG. 2, the antenna array 201-2 may be an alternative antenna array for the antenna array 201-1 towards transmission-reception point 202.

When the serving antenna array is under a maximum permissible exposure event, the user device selects, in block 304, based on at least power levels of corresponding antenna arrays, which one of one or more alternative antenna arrays and the serving antenna panel is to be used for transmitting at least a positioning signal to the transmission-reception point. The power levels are based on measured power levels of received reference signals, and the power back-off to be used for the serving antenna array may be reduced from the measured power level before the selection is performed. The same applies naturally also to a non-serving antenna array if it is under a maximum permissible exposure event. This ensures that the user blockage to all antenna panels, including the non-serving antenna arrays, is taken into account and the best possible antenna array is selected. Also other criterium, like the likelihood of a maximum permissible exposure event to happen, may be used when the antenna array is selected. When the antenna array has been selected, the user device transmits in block 305 at least the positioning signal to the transmission-reception point using the selected antenna array. Using the example of FIG. 2, the user device selects, whether to use the antenna array 201-1 or the antenna array 201-2, and the transmits at least the positioning signal using the selected antenna array. By doing the selection, the likelihood of successful reception of uplink positioning signals at the target transmission-reception point is maximized, which in turn increases accuracy of estimated positioning.

Figure 4:
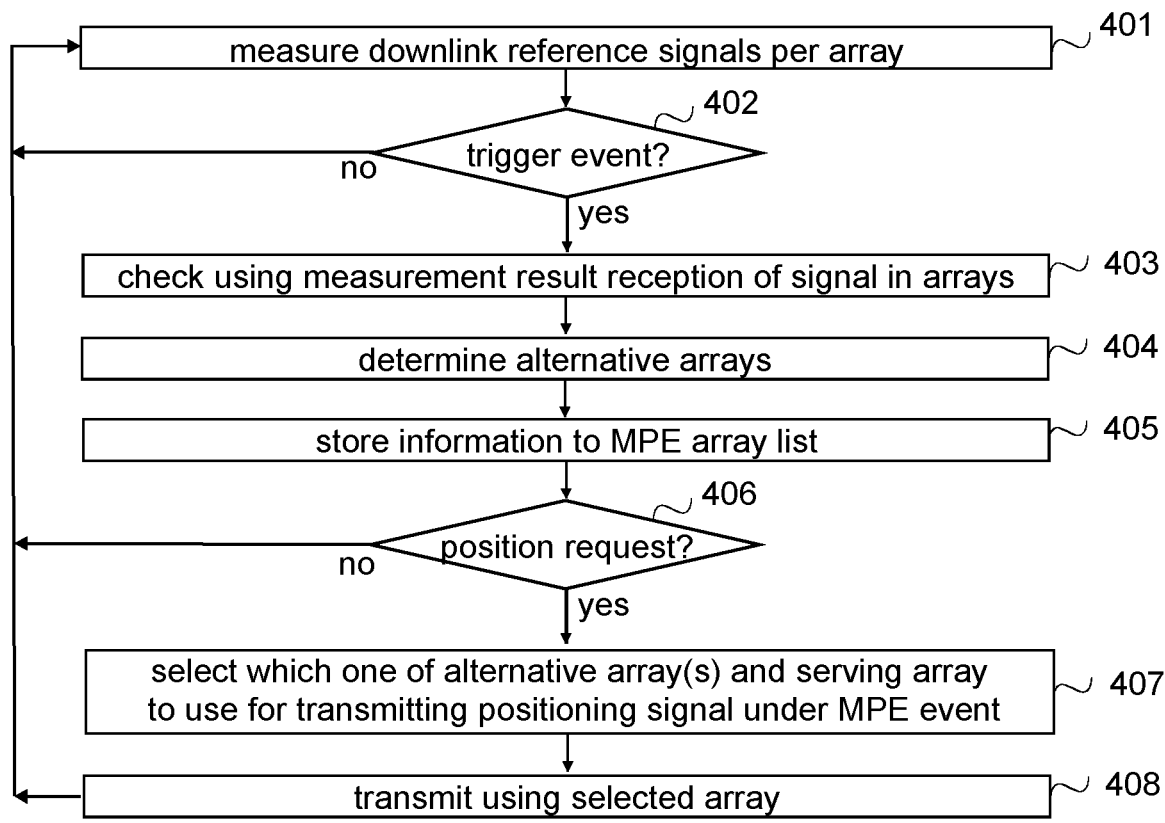

Referring to FIG. 4, the user device measures in block 401, per an antenna array, downlink reference signals received from transmission-reception points, as described above with block 301. In the illustrated example, the measuring (and monitoring) is continued (block 402: no) until the user device detects a trigger event (block 402: yes). The trigger event may be that the user device detects a maximum permissible exposure event in the serving antenna array or the user device detects a prediction of a maximum permissible exposure event.

When the trigger event is detected (block 402: yes), the user device checks, in block 403, corresponding to block 302 in FIG. 3, per a transmission-reception point, based on measurement results, whether a downlink reference signal from the transmission-reception point is received in a serving antenna array and in one or more non-serving antenna arrays with a first delay.

The user device determines, in block 404, corresponding to block 303 in FIG. 3, per a non-serving antenna array included in the one or more non-serving antenna arrays that received the downlink reference signal with the first delay, the non-serving antenna array to be an alternative antenna array to the serving antenna array. The user device also stores, in block 405, information on the alternative array(s) to a maximum permissible exposure antenna array list (MPE array list), the information comprising measured power levels. For example, the a maximum permissible exposure antenna array list may comprise the information per a transmission-reception point. In some implementations, the storing may include ranking the alternative arrays, for example using the measured power level, possibly also the likelihood of a maximum permissible exposure event to happen. The maximum permissible exposure antenna array list may associate a transmission-reception point (TRP) identifier with an antenna array (A) identifier and its measured power level (PL). The list may be as follows (per a serving antenna array if the user device can have more than one serving antenna array at a time):

TRP1-A2-PL10
TRP1-A4-PL9
TRP2-A4-PL11
TRP2-A3-PL9
TRP2-A2-PL7

Then it is checked, in block 406, whether a positioning request is received. If not (block 406: no), the process returns to block 401 to measure downlink reference signals per an antenna array.

If a positioning request is received (block 406: yes), when the serving antenna array is under a maximum permissible exposure event (detected in block 402), the user device selects, in block 407, corresponding to block 304 in FIG. 3, using the information stored to the maximum permissible exposure antenna array list, based on at least power levels of corresponding antenna arrays, which one of one or more alternative antenna arrays and the serving antenna panel is to be used for transmitting at least a positioning signal to the transmission-reception point; and the user device transmits in block 408 at least the positioning signal to the transmission-reception point using the selected antenna array. Then the process continues to block 401 to measure downlink reference signals per an antenna array.

Figure 5:
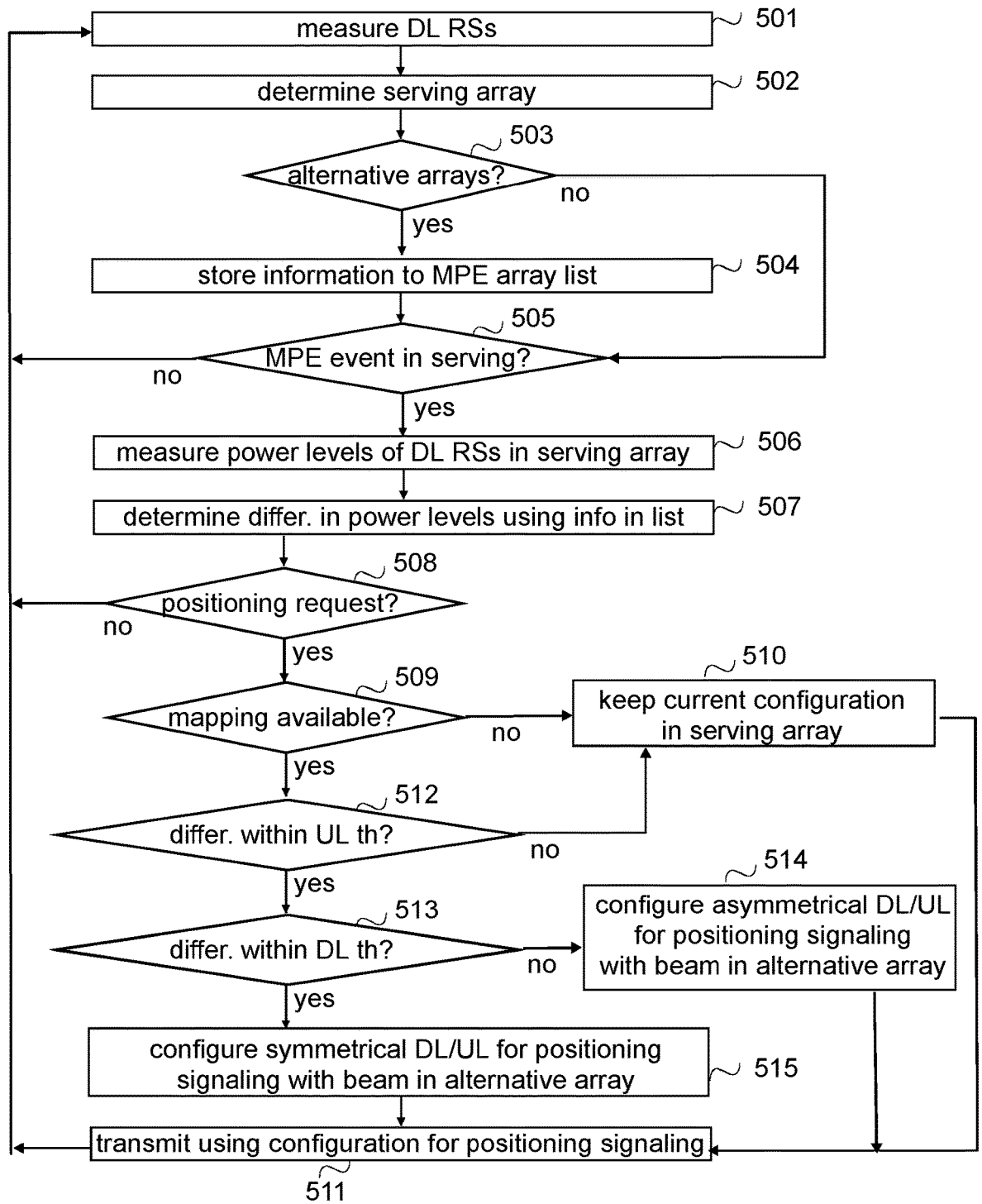
Figure 6:
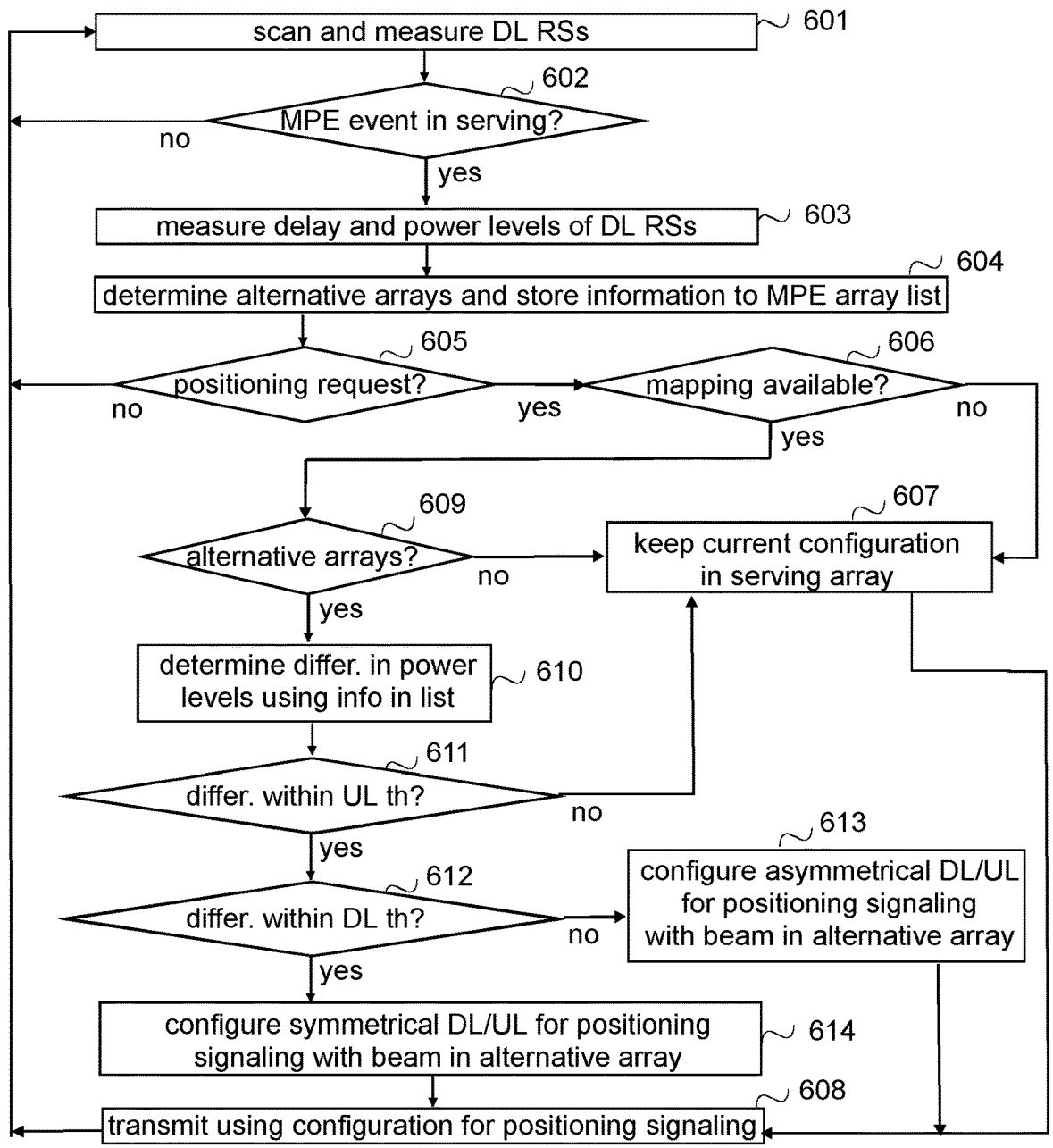

FIGS. 5 and 6 illustrates example in which uplink positioning signaling from the user device and downlink positioning signaling to the user device may use different antenna arrays. In the example illustrated in FIG. 5, the user device is configured to keep track on alternative antenna arrays continuously and in the example in FIG. 6, the user device is configured to keep track on alternative antenna arrays when it is predicted that they may be needed.

Referring to FIG. 5, the user device measures in block 501, per an antenna array, downlink (DL) reference signals (RSs) received from transmission-reception points, as described above with block 301. In the illustrated example of FIG. 5, it is assumed that the user device performs the measurement with wide beams at the antenna arrays. The antenna array(s) that received the downlink reference signal at the highest power level is determined in block 502 to be the serving antenna array.

Then the user device determines in block 503, based on the measurement results, whether there are any alternative antenna arrays for the serving antenna array. An antenna array is determined to be an alternative antenna array, if the antenna arrays receives the same reference signal with the same transmission-reception point identifier with the same delay as the serving antenna array. In other words the alternative antenna array and the serving antenna array receives a reference signal from a transmission-reception point with a first delay. This time of arrival evaluation can be performed by analyzing a power delay profile of the reference signal per an antenna array. (The power delay profile gives an intensity of a signal received through a multipath channel as a function of time delay, which is the difference in travel time between multipath arrivals.)

If there are one or more alternative antenna arrays (block 503: yes), the user device stores in block 504 this information to a maximum permissible exposure antenna array list, as described in more detail above with block 405 in FIG. 4. Then the user device checks in block 505, whether a maximum permissible exposure event in the serving antenna array is detected. The process proceeds to block 505 without storing if there is no alternative antenna arrays (block 503: no).

If a maximum permissible exposure event in the serving antenna array is not detected (block SOS: no), the process returns to block 501 to measure downlink reference signals.

If a maximum permissible exposure event in the serving antenna array is detected (block SOS: yes), the user device measures in block 506 power levels of downlink reference signals in the serving antenna array. In other words, in 5G reference signals received power (RSRP) is measured. Then, per a transmission-reception point wherefrom downlink reference signals are received and measured in block 506, differences in power levels between the serving antenna array and the one or more alternative antenna arrays (if any exists) is determined in block 507 using the information stored to the maximum permissible exposure antenna array list. In other words, only links/antenna arrays that have been earlier determined as alternatives to the serving link/antenna array are evaluated. In an implementation, the power back off may be deducted from the power level in the serving antenna array before the differences are determined.

Then it is checked, in block 508, whether a positioning request is received. If not (block 508: no), in the illustrated example the process returns to block 501 to measure downlink reference signals per an antenna array. In another example the process may also return to block 505, depending on timing of the positioning request and timing of downlink reference signals. As known, in the multi-cell round trip time positioning, for example, the user device receives from the network a request to receive and transmit x amount of position reference signals (receive positioning reference signals, PRSs, and transmit sounding reference signals for positioning, SRS-P's) to y amount of different transmission reception points. Thanks to the previous blocks, the user device has kept track of the surrounding transmission-reception points from where it has received a reference signal on any antenna array. As such, the user device already knows for which transmission-reception points (transmission-reception point identifiers) it will change the antenna array for receiving and transmitting those specific position reference signals (PRS's and SRS-P's).

If a positioning request is received (block 508: yes), it is checked in block 509, whether mapping between positioning reference signals to be transmitted from the user device and cell identifiers indicating targeted transmission-reception points is available at the user device. The mapping may be received in the positioning request or in a specific synchronization signal block, for example.

If no mapping is available (block 509: no), the user device is configured to keep (block 510) the current configuration, including beam width definitions, in the serving antenna array. In other words, the serving antenna array is selected.

In another implementation the serving antenna array is selected in block 510, but the beam configuration may be changed, depending on the capabilities of the user device, for example. Since the serving antenna array is under maximum permissible exposure restrictions, whereby the user is in a close vicinity to the serving antenna array, a preconfigured codebook for narrow beam alignments may not be valid due to the user acting as a reflector, configuring a wide beam may be caused.

Then the user device transmits in block 511, per a transmission-reception point whereto positioning signals are to be transmitted, at least the positioning signal to the transmission-reception point using the selected antenna array with the determined configuration for positioning signaling. Also positioning reports on positioning signals received by the user device (not illustrated separately herein) may be transmitted using the selected antenna array. The antenna array used for positioning reports should be able to use a high enough transmission power for the report to reach the transmission-reception point. Then the process continues to block 501 to measure downlink reference signals per an antenna array.

If mapping is available (block 509: yes), the user device uses the differences determined in block 507, by first checking, whether the difference is within a threshold for uplink transmissions (within UL th). The threshold may be a threshold for a sounding reference signal. The threshold may be called a threshold uplink beam switch threshold. The threshold is determined by the power headroom at the user device. If the difference is not within the threshold for uplink transmissions (block 512: no), the process proceeds to block 510 to keep the current configuration in the serving antenna array. In the illustrated example, if no difference was determined in block 507 because there was no alternative arrays, it is interpreted that a non-existence of a difference is a difference not within the threshold for uplink transmission.

If the difference is within the threshold for uplink transmissions (block 512: yes), the user device checks, in block 513, whether the difference is within a threshold for downlink transmissions (within DL th). For example, based on reception power and/or a noise value, such as signal-to-interference-plus-noise ratio value, the best downlink antenna array is selected, and then its measured value(s) with user blockage are compared to measured value(s) with user blockage on other antenna arrays, and the best one selected.

If the difference is not within the threshold for downlink transmissions (block 513: no), the user device will configure in block 514 an asymmetrical downlink/uplink by selecting for uplink, i.e. for transmitting at least one positioning signal, an alternative antenna array and by configuring a beam in the alternative antenna array for the positioning signaling for the uplink. The beam may be configured as a wide beam or a narrow beam, depending on the capabilities of the user device, and computation of angle of arrival, for example. However, for the downlink the current configuration in the serving antenna array will be used. Then the user device proceeds to block 511 to transmit at least the positioning and to use the selected antenna arrays with the determined configuration for positioning signaling.

If the difference is within the threshold for downlink transmissions (block 513: yes), the user device will configure in block 515 a symmetrical downlink/uplink by selecting an alternative antenna array and by configuring a beam in the alternative antenna array for positioning signaling (for the uplink positioning signal and report, and for downlink reception of positioning signals). Configuring for positioning signaling means that the propagation path, i.e. the serving antenna, for other signaling and data transmission will not change. The beam may be configured as a wide beam or a narrow beam, depending on the capabilities of the user device, and computation of angle of arrival, for example. Then the user device proceeds to block 511 to transmit at least the positioning and to use the selected antenna array with the determined configuration for positioning signaling.

To have the two different thresholds, one for uplink and one for downlink, it is taken into account that the power back-off caused by the maximum permissible exposure event, affects uplink transmissions, not downlink transmissions.

In one implementation, the selection of the antenna array for uplink positioning signaling may be implemented using following formula:

---

For Known TRP ID(x) mapped to the serving panel under MPE.
  IF RS_RSRP_Pser_MPE < RS_RSRP_Palt - UL_beam_switch_threshold;
    THEN Switch UL antenna array
      ELSE Stay on serving antenna array under MPE restrictions
  END
Next TRP ID

--- wherein
TRP ID is transmission-reception point identification parameter,
RS_RSRP_Pser_MPE is measured synchronization signal block/positioning reference signal received power level on the serving antenna array while under maximum permissible exposure restrictions
RS_RSRP_Palt is measured synchronization signal block/positioning reference signal received power level on the best, based at least on the power level, alternative antenna array
UL_beam_switch_threshold is the threshold for conducting the uplink beam switch, including antenna array switch.

Referring to FIG. 6, the user device measures in block 601, per an antenna array, downlink (DL) reference signals (RSs) received from transmission-reception points, as described above with block 301. In the illustrated example of FIG. 6, it is assumed that the user device performs the measurement with wide beams at the antenna arrays. Although not illustrated as a separate block, the antenna array(s) that received the downlink reference signal at the highest power level is determined to be the serving antenna array.

Then the user device checks in block 602, whether a maximum permissible exposure event in the serving antenna array is detected. If a maximum permissible exposure event in the serving antenna array is not detected (block 602: no), the process returns to block 601 to measure downlink reference signals.

If a maximum permissible exposure event in the serving antenna array is detected (block 602: yes), the user device measures in block 603 power levels of downlink reference signals in antenna arrays, including the serving antenna array.

Then the user device determines in block 604, based on the measurement results, whether there are any alternative antenna arrays for the serving antenna array, for example as described above with block 503, and stores in block 604 this information to a maximum permissible exposure antenna array list, as described in more detail above with block 405 in FIG. 4.

Then it is checked, in block 605, corresponding to block 508 in FIG. 5, whether a positioning request is received. If not (block 605: no), the process returns to block 601 to measure downlink reference signals per an antenna array.

If a positioning request is received (block 605: yes), it is checked in block 606, corresponding to block 509 in FIG. 5, whether mapping between positioning reference signals to be transmitted from the user device and cell identifiers indicating targeted transmission-reception points is available at the user device.

If no mapping is available (block 605: no), the user device is configured to keep (block 607, corresponding to block 510) the current configuration, including beam width definitions, in the serving antenna array. In other words, the serving antenna array is selected. As described with FIG. 5, in another implementation the serving antenna array is selected, but the beam configuration may be changed.

Then the user device transmits in block 608, corresponding to block 511 in FIG. 5, per a transmission-reception point whereto positioning signals are to be transmitted, at least the positioning signal to the transmission-reception point using the selected antenna array with the determined configuration for positioning signaling. Also positioning reports on positioning signals received by the user device (not illustrated separately herein) are transmitted using the selected antenna array. Then the process continues to block 601 to measure downlink reference signals per an antenna array.

If mapping is available (block 606: yes), the user device checks in block 609, using the information stored to the maximum permissible exposure antenna array list, whether there are one or more alternative antenna arrays available for the serving antenna array. If there are no alternative antenna arrays available (block 609: no), the process proceeds to block 607 to keep the current configuration.

If alternative antenna arrays are available (block 609: yes), the user device determines in block 610, differences in power levels between the serving antenna array and the one or more alternative antenna arrays using the information stored to the maximum permissible exposure antenna array list. In other words, only links/antenna arrays that have been earlier determined as alternatives to the serving link/antenna array are evaluated. In an implementation, the power back off may be deducted from the power level in the serving antenna array before the differences are determined.

Then the user device uses the differences determined in block 610, as described above with blocks 512 and 513 to select and configure, as described with blocks 510, 514 and 515, antenna array(s). In other words, the user device checks in block 611, whether the difference is within a threshold for uplink transmissions (within UL th). If the difference is not within the threshold for uplink transmissions (block 611: no), the process proceeds to block 607 to keep the current configuration in the serving antenna array.

If the difference is within the threshold for uplink transmissions (block 611: yes), the user device checks, in block 612, whether the difference is within a threshold for downlink transmissions (within DL th).

If the difference is not within the threshold for downlink transmissions (block 612: no), the user device will configure in block 613 an asymmetrical downlink/uplink by selecting for uplink, i.e. for transmitting at least one positioning signal, an alternative antenna array and by configuring a beam in the alternative antenna array for the positioning signaling for the uplink. The beam may be configured as a wide beam or a narrow beam, depending on the capabilities of the user device, and computation of angle of arrival, for example. However, for the downlink the current configuration in the serving antenna array will be used. Then the user device proceeds to block 608 to transmit at least the positioning and to use the selected antenna arrays with the determined configuration for positioning signaling.

If the difference is within the threshold for downlink transmissions (block 612: yes), the user device will configure in block 613 a symmetrical downlink/uplink by selecting an alternative antenna array and by configuring a beam in the alternative antenna array for positioning signaling (for the uplink positioning signal and report, and for downlink reception of positioning signals). The beam may be configured as a wide beam or a narrow beam, depending on the capabilities of the user device, and computation of angle of arrival, for example. Then the user device proceeds to block 608 to transmit at least the positioning and to use the selected antenna array with the determined configuration for positioning signaling.

As can be seen from the above examples, a secondary antenna array (one of the one or more alternative antenna arrays) may be selected for transmission of a positioning signal towards a target transmission-reception point when the serving antenna array (the best antenna array) is under maximum permissible exposure restrictions. Hence, transmission with high power, or at least with highest possible transmission power, towards a transmission-reception point is ensured. Further, as can be seen from the above examples, the propagation path for positioning signaling is line-of-sight path, and thus ensures that switching to a secondary panel maintains the line-of-sight path towards the target transmission-reception point. Even if the path loss may be increased due to suboptimum user device secondary antenna array gain in the direction of the target transmission-reception point, it is most likely still superior to the line-of-sight path loss of the maximum permissible exposure impacted antenna array and thus a better choice. The user device is thus able to locally compensate the effect of the maximum permissible exposure to meet 20 cm positioning accuracy, for example. Furthermore, the accuracy can be increased, since it is ensured that more transmission-reception points receive positioning signals from the user device than without a possibility to select an alternative antenna array. On the other hand, since it is ensured that transmission-reception points receive positioning signals, the number of transmission-reception points participating to the positioning may be reduced with the same positioning accuracy.

The blocks, related functions, and information exchanges described above by means of FIGS. 2 to 6 are in no absolute chronological order, and some of them may be performed simultaneously or in an order differing from the given one. For example, the time line of a positioning request, positioning signaling transmission and downlink reference signal transmission from a transmission reception point may change the order described above. Other functions can also be executed between the blocks and/or information exchanges, or within them, and other information may be transmitted, and/or other rules applied or selected. Some of the blocks or part of the blocks or one or more pieces of information can also be left out or replaced by a corresponding block or part of the block or one or more pieces of information.

Figure 7:
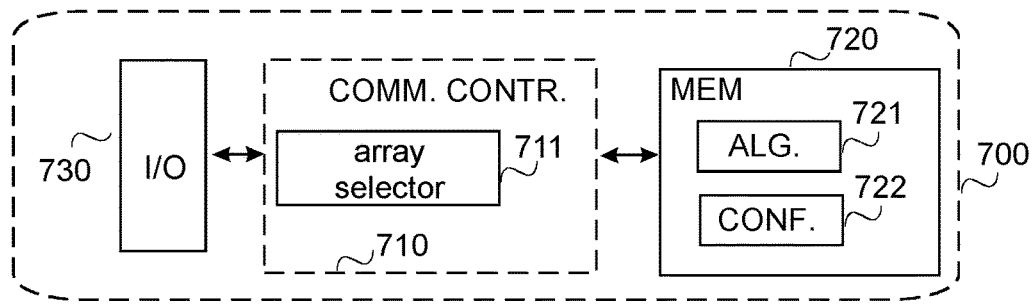
FIG. 7 is schematic block diagrams.

FIG. 7 illustrates an apparatus comprising a communication controller 710, such as at least one processor or processing circuitry, and at least one memory 720, including a computer program code (software, algorithm) ALG. 721, wherein the at least one memory and the computer program code (software, algorithm) are configured, with the at least one processor, to cause the apparatus to carry out any one of the embodiments, examples and implementations described above with the user device. FIG. 7 illustrates an apparatus to be positioned, configured to send positioning reports. The apparatus of FIG. 7 may be an electronic device, examples being listed above with FIGS. 1 and 2.

Referring to FIG. 7, the memory 720 may be implemented using any suitable data storage technology, such as semiconductor based memory devices, flash memory, magnetic memory devices and systems, optical memory devices and systems, fixed memory and removable memory. The memory may comprise a configuration storage CONF. 721 such as a configuration database, for at least storing reference signal related information, for example the maximum permissible exposure antenna array list, and/or antenna array configurations. The memory 720 may further store a data buffer for data waiting to be processed (including transmission).

Referring to FIG. 7, the apparatus 700 may further comprise a communication interface 730 comprising hardware, including two or more antenna arrays and/or software for realizing communication connectivity according to one or more communication protocols. The communication interface 730 may provide the apparatus 700 with communication capabilities with different network elements, such as transmission-reception points, which may use different radio access technologies, and network elements configured to provide the location management function. The communication interface may comprise standard well-known analog components such as an amplifier, filter, frequency-converter and circuitries, and conversion circuitries transforming signals between analog and digital domains. Digital signal processing regarding transmission and reception of signals may be performed in a communication controller 710.

The communication controller 710 comprises an antenna array selecting circuitry 711 (array selector) configured to measure reference signals and select which antenna array to use for one or more positioning signals according to any one of the embodiments/examples/implementations described above. The antenna array selecting circuitry 711 may be configured to select an antenna array to be used according to any one of the embodiments/examples/implementations described above. The communication controller 710 may control the antenna array selecting circuitry 711.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 6 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 6, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer readable medium comprises said computer program. In an embodiment, the computer program is a computer program comprising instructions which, when the program is executed by an apparatus, cause the apparatus to carry out at least: measuring, per an antenna array, downlink reference signals received from transmission-reception points; checking, per a transmission-reception point, based on measurement results, whether a downlink reference signal from the transmission-reception point is received in a serving antenna array and in one or more non-serving antenna arrays with a first delay; determining, per a non-serving antenna array included in the one or more non-serving antenna arrays that received the downlink reference signal with the first delay, the non-serving antenna array to be an alternative antenna array to the serving antenna array; selecting, when the serving antenna array is under a maximum permissible exposure event, based on at least power levels of corresponding antenna arrays, which one of one or more alternative antenna arrays and the serving antenna panel is to be used for transmitting at least a positioning signal to the transmission-reception point; and transmitting at least the positioning signal to the transmission-reception point using the selected antenna array. In an embodiment, the computer readable medium is a non-transitory computer readable medium comprising program instructions for causing an apparatus to perform at least the following: measuring, per an antenna array, downlink reference signals received from transmission-reception points; checking, per a transmission-reception point, based on measurement results, whether a downlink reference signal from the transmission-reception point is received in a serving antenna array and in one or more non-serving antenna arrays with a first delay; determining, per a non-serving antenna array included in the one or more non-serving antenna arrays that received the downlink reference signal with the first delay, the non-serving antenna array to be an alternative antenna array to the serving antenna array; selecting, when the serving antenna array is under a maximum permissible exposure event, based on at least power levels of corresponding antenna arrays, which one of one or more alternative antenna arrays and the serving antenna panel is to be used for transmitting at least a positioning signal to the transmission-reception point; and transmitting at least the positioning signal to the transmission-reception point using the selected antenna array.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising
at least two antenna arrays;
at least one processor; and
at least one memory including computer program code, the at least one memory and computer program code configured to, with the at least one processor, cause the apparatus at least to perform:
measuring, per an antenna array, downlink reference signals received from transmission-reception points;
checking, per a transmission-reception point, based on measurement results, whether a downlink reference signal from the transmission-reception point is received in a serving antenna array and in one or more non-serving antenna arrays with a delay;
determining, per a non-serving antenna array included in the one or more non-serving antenna arrays that received the downlink reference signal with the delay, the non-serving antenna array to be an alternative antenna array to the serving antenna array;
selecting, when the serving antenna array is under a maximum permissible exposure event, based on at least power levels of antenna arrays, which one of one or more non-serving antenna arrays and the serving antenna array is to be used for transmitting at least a positioning signal to the transmission-reception point; and
transmitting at least the positioning signal to the transmission-reception point using the selected antenna array.

2. The apparatus of claim 1, wherein the at least one memory and computer program code are further configured to, with the at least one processor, cause the apparatus at least to perform:
storing information on alternative antenna arrays to a specific list; and
using the information in the specific list when performing the selecting.

3. The apparatus of claim 1, wherein the at least one memory and computer program code are further configured to, with the at least one processor, cause the apparatus at least to perform:
storing information on alternative antenna arrays to a specific list; and
determining differences in power levels between the serving antenna array and the one or more alternative antenna arrays using the information in the specific list.

4. The apparatus of claim 3, wherein the at least one memory and computer program code are further configured to, with the at least one processor, cause the apparatus at least to perform:
selecting an antenna array for positioning signal transmission and positioning report transmission and an antenna array for positioning signal reception using the determined differences, wherein
if the difference is not within an uplink threshold, selecting the serving antenna array for the positioning signal transmission and the positioning report transmission and for the positioning signal reception;
if the difference is within the uplink threshold but not within a downlink threshold, selecting an alternative antenna array for the positioning signal transmission and the positioning report transmission and the serving antenna array for positioning signal reception; and
if the difference is within the uplink threshold and within the downlink threshold, selecting an alternative antenna array for the positioning signal transmission and the positioning report transmission and for positioning signal reception,
wherein selecting the alternative antenna array includes configuring a beam in the alternative array.

5. The apparatus of claim 1, wherein the at least one memory and computer program code are further configured to, with the at least one processor, cause the apparatus to perform the selecting after receiving a positioning request.

6. The apparatus of claim 1, wherein the at least one memory and computer program code are further configured to, with the at least one processor, cause the apparatus to perform the checking, determining and selecting in response to a trigger event being detected.

7. The apparatus of claim 6, wherein the trigger event is a maximum permissible exposure event.

8. The apparatus of claim 1, wherein the at least one memory and computer program code are further configured to, with the at least one processor, cause the apparatus to perform the checking in a continuous manner and the determining and selecting in response to a trigger event being detected.

9. A method for an apparatus comprising at least two antenna arrays, the method comprising:
measuring, per an antenna array, downlink reference signals received from transmission-reception points;
checking, per a transmission-reception point, based on measurement results, whether a downlink reference signal from the transmission-reception point is received in a serving antenna array and in one or more non-serving antenna arrays with a delay;
determining, per a non-serving antenna array included in the one or more non-serving antenna arrays that received the downlink reference signal with the delay, the non-serving antenna array to be an alternative antenna array to the serving antenna array;
selecting, when the serving antenna array is under a maximum permissible exposure event, based on at least power levels of antenna arrays, which one of one or more non-serving antenna arrays and the serving antenna array is to be used for transmitting at least a positioning signal to the transmission-reception point; and
transmitting at least the positioning signal to the transmission-reception point using the selected antenna array.

10. The method of claim 9, the method further comprising:

storing information on alternative antenna arrays to a specific list; and using the information in the specific list when performing the selecting.

11. The method of claim 9, the method further comprising:

storing information on alternative antenna arrays to a specific list; and determining differences in power levels between the serving antenna array and the one or more alternative antenna arrays using the information in the specific list.

12. The method of claim 11, the method further comprising:

selecting an antenna array for positioning signal transmission and positioning report transmission and an antenna array for positioning signal reception using the determined differences, wherein if the difference is not within an uplink threshold, selecting the serving antenna array for the positioning signal transmission and the positioning report transmission and for the positioning signal reception;

if the difference is within the uplink threshold but not within a downlink threshold, selecting an alternative antenna array for the positioning signal transmission and the positioning report transmission and the serving antenna array for positioning signal reception; and if the difference is within the uplink threshold and within the downlink threshold, selecting an alternative antenna array for the positioning signal transmission and the positioning report transmission and for positioning signal reception, wherein selecting the alternative antenna array includes configuring a beam in the alternative array.

13. The method of claim 9, the method further comprising:

performing the selecting after receiving a positioning request.

14. The method of claim 9, the method further comprising:

performing the checking, determining and selecting in response to a trigger event being detected.

15. The method of claim 14, wherein the trigger event is a maximum permissible exposure event.

16. The method of claim 9, the method further comprising:

performing the checking in a continuous manner and the determining and selecting in response to a trigger event being detected.

17. A non-transitory computer readable medium comprising program instructions for causing an apparatus to perform at least the following:

measuring, per an antenna array, downlink reference signals received from transmission-reception points;

checking, per a transmission-reception point, based on measurement results, whether a downlink reference signal from the transmission-reception point is received in a serving antenna array and in one or more non-serving antenna arrays with a delay;

determining, per a non-serving antenna array included in the one or more non-serving antenna arrays that received the downlink reference signal with the delay, the non-serving antenna array to be an alternative antenna array to the serving antenna array;

selecting, when the serving antenna array is under a maximum permissible exposure event, based on at least power levels of antenna arrays, which one of one or more non-serving antenna arrays and the serving antenna array is to be used for transmitting at least a positioning signal to the transmission-reception point; and transmitting at least the positioning signal to the transmission-reception point using the selected antenna array.

18. A system comprising:

a plurality of transmission-reception points configured to transmit different reference signals to and measure positioning signals from apparatuses; and at least one apparatus comprising at least two antenna arrays and configured to: measure, per an antenna array, downlink reference signals received from transmission-reception points of the plurality of transmission-reception points; check, per a transmission-reception point, based on measurement results, whether a downlink reference signal from the transmission-reception point is received in a serving antenna array and in one or more non-serving antenna arrays with a delay; determine, per a non-serving antenna array included in the one or more non-serving antenna arrays that received the downlink reference signal with the delay, the non-serving antenna array to be an alternative antenna array to the serving antenna array; select, when the serving antenna array is under a maximum permissible exposure event, based on at least power levels of antenna arrays, which one of one or more non-serving antenna arrays and the serving antenna array is to be used for transmitting at least a positioning signal to the transmission-reception point; and transmit at least the positioning signal to the transmission-reception point using the selected antenna array.

19. The system of claim 18, wherein the at least one apparatus is further configured at least to:

store information on alternative antenna arrays to a specific list; and use the information in the specific list when performing the selecting.

20. The system of claim 18, wherein the at least one apparatus is further configured at least to:

store information on alternative antenna arrays to a specific list; and determine differences in power levels between the serving antenna array and the one or more alternative antenna arrays using the information in the specific list.

* * * * *